United States Patent [19]

Moriarty, Jr.

[11] Patent Number: 4,668,571
[45] Date of Patent: May 26, 1987

[54] COEXTRUSTION TIE LAYER AND PROCESS FOR PRODUCING SUCH TIE LAYER

[75] Inventor: James W. Moriarty, Jr., Sturbridge, Mass.

[73] Assignee: The Dow Chemical Company, Midland, Mich.

[21] Appl. No.: 859,176

[22] Filed: May 2, 1986

[51] Int. Cl.⁴ .................... B32B 27/14; B32B 5/16
[52] U.S. Cl. .................... 428/327; 156/244.11; 156/244.18; 428/476.1; 428/475.8; 428/476.9; 428/516; 525/179
[58] Field of Search .............. 156/244.11, 244.18; 428/327, 475.8, 476.1, 476.9, 516; 525/179

[56] References Cited

U.S. PATENT DOCUMENTS

| | | | |
|---|---|---|---|
| 4,104,404 | 8/1978 | Bieler et al. | 428/476.9 |
| 4,407,873 | 10/1983 | Christensen et al. | 428/476.1 |
| 4,419,408 | 12/1983 | Schmukler et al. | 428/476.1 |
| 4,588,648 | 5/1986 | Krueger et al. | 428/476.1 |
| 4,617,240 | 10/1986 | Krueger et al. | 428/476.1 |

Primary Examiner—William J. van Balen
Attorney, Agent, or Firm—L. E. Hessenaur, Jr.

[57] ABSTRACT

The present invention relates to a stock material and a process for producing such stock material. The stock material comprises a first outer layer of polyamide resin, a second outer layer of polyolefin resin and a tie layer therebetween which comprises a copolymer of ethylene and maleic anhydride, a polyamide resin and a polyolefin resin. The process of the invention comprises the steps of providing a particulate material having a layer of polyamide resin, a layer of polyolefin resin and a layer therebetween comprising a copolymer of ethylene and maleic anhydride; admixing the particulate material with a copolymer of ethylene and maleic anhydride to produce a tie layer composition; and coextruding a tie layer of the tie layer composition between and in contact with a first outer layer of polyamide resin and a second outer layer of polyolefin resin.

19 Claims, 3 Drawing Figures

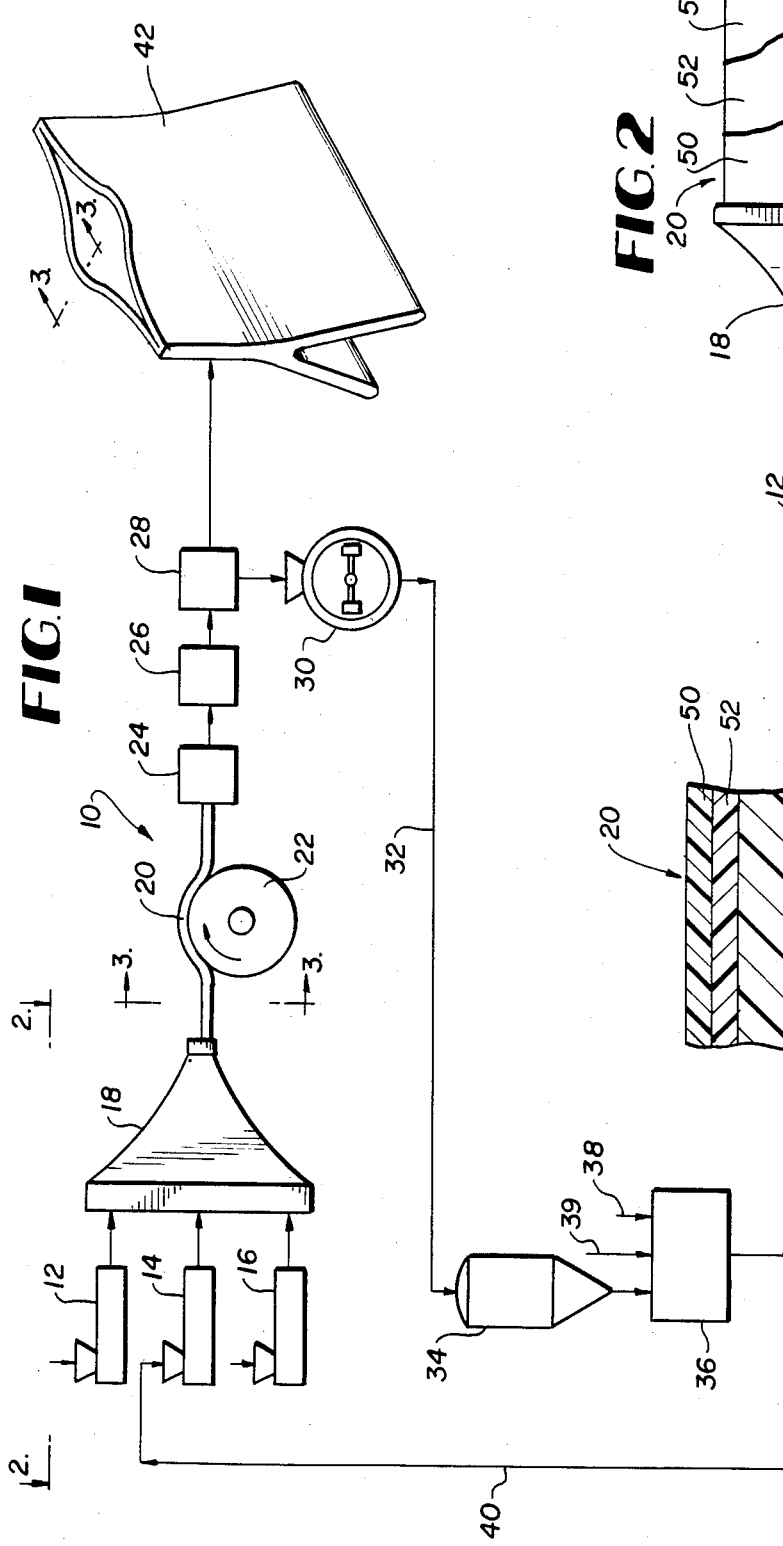

COEXTRUSTION TIE LAYER AND PROCESS FOR PRODUCING SUCH TIE LAYER

BACKGROUND OF THE INVENTION

Thermoplastic stock materials useful for producing flexible, thermoplastic bags or containers for food packaging are well known. Such thermoplastic stock materials can be single-layered or multi-layered. Typically, if the stock material is multi-layered, the inside and outside layers of the thermoplastic materials are different and have different melt temperatures with the inner layer having a lower melt temperature. Generally, in multi-layered stock materials the inner and outer layers are coextruded with a tie layer therebetween. In multi-layered thermoplastic stock materials having a plurality of layers, there is typically a tie layer provided between each pair of thermoplastic layers. Thus, in a thermoplastic stock material having one outer layer and one inner layer, there will be one tie layer therebetween. In a structure having three thermoplastic layers, there will be two tie layers provided.

Heretofore, excess scrap from the production of thermoplastic films or bags from a thermoplastic stock material has been discarded and sent to land fill. In some cases, the scrap can be used as an additional layer in a thermoplastic stock material. However, use of the scrap as an additional layer in a thermoplastic stock material would require the use of at least one additional tie layer to incorporate the additional scrap layer in the thermoplastic stock material. Use of the scrap as an additional layer involves the use of additional equipment, the necessity of additional tie layers and the expenses associated therewith. In addition, the use of scrap as an additional layer can cause a decrease in the performance and optical characteristics of a thermoplastic film.

It is, therefore, an object of the present invention to incorporate scrap material from the production of thermoplastic bags into a thermoplastic stock material in a manner which does not suffer from the disadvantages of known methods.

It is another object of the present invention to incorporate the scrap material in the tie layer of a coextrusion.

It is yet another object of the present invention to provide a process for using the scrap material which does not require the incorporation of an additional layer in a coextruded thermoplastic stock material.

A further object of the present invention is to provide a composition useful as the tie layer in a coextrusion, which tie layer comprises scrap material obtained from the production of thermoplastic film or bags from a thermoplastic stock material.

A still further object of the present invention is to provide a process for incorporating scrap material in a coextruded thermoplastic stock material which does not require the use of additional tie layers.

Yet another object of the present invention is to provide a three layer, coextruded thermoplastic stock material having scrap material incorporated in the tie layer of the stock material.

Additional objects and advantages of the present invention will be apparent to those skilled in the art by reference to the following detailed description and drawings wherein:

FIG. 1 is an apparatus suitable for producing the stock material of the present invention;

FIG. 2 is a sectional view of the apparatus of FIG. 1 taken along Line 2—2 of FIG. 1; and FIG. 3 is a cross-sectional view of the stock material of the present invention taken along Line 3—3 of FIG. 1.

SUMMARY OF THE INVENTION

According to the present invention there is provided a stock material in the form of a planar sheet of indefinite length. The stock material of the present invention comprises a first outer layer of a polyamide resin, a second outer layer of a polyolefin resin, and a tie layer between the first outer layer and the second outer layer, wherein the tie layer is a composition which is a mixture of a copolymer of ethylene and maleic anhydride, the polyamide resin of the first outer layer and the polyolefin resin of the second outer layer.

According to another aspect of the present invention, there is provided a process for producing the stock material of the present invention. This process for producing the stock material of this invention comprises the steps of coextruding the tie layer between and in contact with the first outer layer and the second outer layer, at an elevated temperature to form a sheet of indefinite running length; removing as scrap, unwanted portions from the sheet of indefinite running length; grinding or coalescing the scrap to produce particulate scrap; mixing the particulate scrap with a copolymer of ethylene and maleic anhydride to form an adhesive composition, and then employing the adhesive composition as the tie layer in the coextruding step.

Referring now to the drawings in general and in particular to FIG. 1, there is shown an apparatus 10 suitable for producing a stock material of the present invention in accordance with the process of the present invention. The apparatus 10 comprises a first extruder 12, a second extruder 14 and a third extruder 16. The extruders 12, 14 and 16 discharge to a feed block 18. The feed block 18 has the general structure shown in Chisholm et al U.S. Pat. No. 3,557,265. Stock material 20 issues from the feed block 18 at an elevated temperature and contacts a chill roll 22 which is maintained at a low temperature. During contact of the feed material 20 with the chill roll 22, and due to subsequent cooling in air, the temperature of the stock material 20 is reduced to room temperature. The stock material 20 is then fed to a folder-joiner 24 then to a sealer 26 and then to a cutter 28. Unwanted portions of the stock material 20 in the form of scrap from the cutter 28 and from other sources is fed to a grinder 30. In the grinder 30, the scrap is ground to produce particulate scrap which is fed through the line 32 to a silo 34. The particulate scrap from the silo 34 is fed to a blender 36. A copolymer of ethylene and maleic anhydride is also fed to the blender 36 through line 38. Fresh polyolefin resin, such as polyethylene can be fed to the blender 36 through line 39. In the blender 36 is produced a composition which leaves the blender 36 through line 40 and becomes the feed material for the extruder 14.

Downstream of the cutter 28, the apparatus 10 produces a storage bag 42. One structure of a storage bag 42 is shown in Stevenson U.S. Pat. No. 4,358,466.

As shown in FIGS. 2 and 3, the stock material 20 comprises a first outer layer 50, a tie layer 52 and a second outer layer 54. The first outer layer 50 is a polyamide resin fed to the feed block 18 by the extruder 12. The second outer layer 54 is a polyolefin resin fed to the feed block 18 by the extruder 16. The tie layer 52 is fed to the feed block 18 by the extruder 14. The composition of the tie layer 52 is described more completely elsewhere herein.

The stock material 20 shown in FIG. 3 can also be produced using conventional blown film technology. Using blown film technology, the extruders 12, 14 and 16 discharge to a ring or annular slit instead of the horizontal slit shown in feed block 18 in FIG. 1. As is well known, in blown film methods air is blown into the tube of stock material extruded around the ring or annular slit to produce a large diameter bubble which is cooled in air. Thermoplastic stock materials produced by blown film methods can be cast quickly and can be made much larger than those produced by the apparatus 10 shown in FIG. 1. A thermoplastic stock material of the present invention can be produced using blown film technology and methods which are well known to those skilled in the art of stock material production.

The stock material produced in accordance with the present invention comprises a first outer layer of a polyamide resin, a second outer layer of a polyolefin resin and a tie layer therebetween which constitutes means for bonding the first outer layer to the second outer layer. The tie layer of the present invention is a composition which is a mixture of a copolymer of ethylene and maleic anhydride, the polyamide resin of the first outer layer and the polyolefin resin of the second outer layer. Generally, the weight ratio of the first layer of polyamide resin to the second layer of polyolefin resin in the stock material is from 1:99 to 20:1, and preferably from 1:20 to 20:1. The weight ratio of the first layer of polyamide resin to the tie layer is from 1:99 to 20:1 and preferably is from 1:10 to 20:1.

The polyamide resin employed as the first outer layer in the present invention can be any polyamide heretofore found to be useful for the production of storage bags. The polyamide resin can be produced by the polymerization of caprolactams. Alternatively, it can be produced by the condensation polymerization of any dicarboxylic acid and any diamine. Examples of suitable polyamide resins include among others, nylon 6; nylon 66; nylon 6, 12; amorphous nylon; nylon 11; nylon 12; nylon 4, 6; and nylon blends such as polyester nylon blends. The polyamide resin may comprise a small amount, for example 5%, of additional components such as $SiO_2$ and a polyolefin carrier therefor.

The second outer layer of the stock material produced in accordance with the present invention comprises a polyolefin resin. As used herein the term "polyolefin" means the addition polymerization reaction product of any terminally unsaturated hydrocarbon. Specific examples of suitable polyolefins include among others, polyethylene, polypropylene, polybutene-1 and polymethylpentene. The polyolefins useful in the present invention can be employed in their pure form or can be copolymerized with minor amounts of other vinyl unsaturated monomers which do not change the characteristics of the polyolefin. The polyolefins can be isotactic or can be atactic. They can be homopolymers or copolymers. They can be linear or branched. The graft copolymers are also useful. The polyolefins can be of the high density type or can be of the low density type.

The tie layer of the present invention comprises the polyamide resin of the first outer layer, the polyolefin resin of the second outer layer and a copolymer of ethylene and maleic anhydride.

The copolymer of ethylene and maleic anhydride can be a random copolymer, a block copolymer or a graft copolymer. The copolymer can have widely varying amounts of maleic anhydride, but generally has 0.5 to 20 and preferably 0.5 to 5 percent by weight maleic anhydride based upon the weight of the copolymer. At concentrations of maleic anhydride which are much lower, a decreased adhesion of the tie layer 52 to the polyamide layer 50 is observed. At much higher percentages of maleic anhydride, the resultant copolymer becomes stiff and difficult to blend.

The tie layer of the present invention is produced by providing a film comprising a polyamide resin layer, a polyolefin resin layer and a bonding layer therebetween which comprises ethylene and maleic anhydride. This film is preferably scrap material produced during manufacturing of a stock material or containers therefrom. The film is ground and re-extruded thereby producing pellets or particulate material. These pellets are dry blended with a copolymer of ethylene and maleic anhydride to produce the composition of the tie layer of the present invention. Preferably, the weight ratio of the copolymer of ethylene and maleic anhydride to the particulate material in the tie layer is from 1:1 to 1:20.

To produce the tie layer of this invention, the pellets are mixed with the copolymer of ethylene and maleic anhydride in a ratio sufficient to produce a tie layer composition comprising 0.05 to 0.5% by weight fresh maleic anhydride. As used herein, fresh maleic anhydride is maleic anhydride which is provided by the copolymer of ethylene and maleic anhydride which is added to the pellets. Fresh maleic anhydride does not include any maleic anhydride present in the pellets. Preferably, the tie layer of the present invention comprises 0.1 to 0.25% by weight fresh maleic anhydride.

It is common industrial practice to mix the copolymer of ethylene and maleic anhydride with another polyolefin resin to produce a two component composition of matter characteristically referred to as an adhesive concentrate. The ratio of copolymer to polyolefin polymer is adjusted in order to produce an adhesive concentrate having a maleic acid content of 0.01 to 2.0 and preferably 0.1 to 1.0 parts by weight based upon the weight of the adhesive concentrate. As explained more completely elsewhere herein, this adhesive concentrate is admixed with recycled scrap in order to further reduce the maleic acid content to the narrow and critical range specified elsewhere herein.

Those skilled in the art have theorized that the maleic anhydride in the tie layer serves to bond with the polyamide in the first outer layer. In accordance with the present invention wherein the scrap is recycled there is polyamide present in the scrap and therefore present in the tie layer. It was expected that the maleic anhydride in the copolymer in the tie layer would be completely neutralized by the polyamide present in the tie layer. Completely unexpectedly, the maleic anhydride in the tie layer is not neutralized by the polyamide in the scrap and sufficient maleic anhydride remains, enabling the tie layer composition of this invention to effectively bond the polyamide resin layer to the polyolefin resin layer in the stock material of this invention.

EXAMPLE

This is an example of the production of a stock material in accordance with the present invention.

A film comprising three layers, namely a first layer, a second layer and a third layer, was coextruded by the feed block method through a slit die onto a casting/chill roll assembly. The film comprised 68% by weight of the first layer, 14% by weight of the second layer and 18% by weight of the third layer. The first layer comprised 95% by weight polyethylene and 5% by weight of a composition of 3% $SiO_2$, 4% oleamide and 93% low density polyethylene. The second layer comprised a graft copolymer of high density polyethylene and maleic anhydride in admixture with linear low density polyethylene such that the second layer comprised 0.13% by weight total maleic anhydride. The third layer comprised 95% nylon 6 and 5% by weight of a composition comprising 5% $SiO_2$ in low density polyethylene. This three layer film was ground and then re-extruded on a dual diameter extruder with the extrudate being formed into pellets. These pellets were dry blended anhydride in admixture with linear low density polyethylene to yield a concentration of 0.13% fresh maleic anhydride in the final dry blend. The copolymer of high density polyethylene and maleic anhydride in admixture with linear low density polyethylene comprised 0.62% by weight maleic anhydride.

The dry blended material was then coextruded with a first outer layer and a second outer layer by the feed block method through a slit die onto a chill roll to produce a stock material of the present invention. The first outer layer of this stock material had the same composition as the first layer of the three layer film. The second outer layer had the same composition as the third layer of the three layer film. The tie layer between the first outer layer and the second outer layer of the stock material of this invention was comprised entirely of the dry blended recycle material produced above. The first outer layer comprised 68% by weight of the stock material, the second outer layer comprised 18% by weight of the stock material and the tie layer comprised 14% by weight of the stock material.

Although the invention has been described in detail with reference to specific examples thereof, it will be understood that variations can be made without departing from the scope of the invention as described above and as claimed below.

What is claimed is:

1. A stock material of indefinite running length, said stock material comprising:
   A. a first layer of polyamide resin; and
   B. a second layer of polyolefin resin; and
   C. a tie layer between the first layer and the second layer; and
   wherein said tie layer consititutes means for bonding the first layer to the second layer; and
   wherein said tie layer is a composition which is a mixture of:
   (1) a copolmer of ethylene and maleic anhydride; and
   (2) the polyamide resin of the first layer; and
   (3) the polyolefin resin of the second layer; and
   (4) the composition of the tie layer.

2. A stock material of indefinite running length, said stock material comprising:
   A. a first layer of polyamide resin; and
   B. a second layer of polyolefin resin; and
   C. a tie layer between the first layer and the second layer;
   wherein said tie layer constitutes means for bonding the first layer to the second layer; and
   wherein said tie layer is a composition which is a mixture of:
   (1) a copolymer of ethylene and maleic anhydride; and
   (2) a particulate material comprising a first polyamide layer, a second polyolefin layer and a third layer of ethylene and maleic anhydride, said third layer being between the first polyamide layer and the second polyolefin layer.

3. The stock material of claim 2 wherein the tie layer is a composition which is a mixture of:
   (1) a copolymer of ethylene and maleic anhydride; and
   (2) a particulate material comprising a first polyamide layer, a second polyolefin layer and a third layer of ethylene and, maleic anhydride in admixture with polyethylene, said third layer being between the first polyamide layer and the second polyolefin layer; and
   (3) polyethylene.

4. The stock material of claim 2 wherein the maleic anhydride in the copolymer of ethylene and maleic anhydride in the tie layer comprises 0.05 to 0.5% by weight based on the weight of the tie layer.

5. The stock material of claim 2 wherein the maleic anhydride in the copolymer of ethylene and maleic anhydride in the tie layer comprises 0.1 to 0.25% by weight based on the weight of the tie layer.

6. The stock material of claim 2 wherein the weight ratio of A:B is from 1:20 to 20:1.

7. The stock material of claim 2 wherein the weight ratio of A:C is from 1:10 to 20:1.

8. The stock material of claim 2 wherein the weight ratio of the copolymer of ethylene and maleic anhydride to the particulate material in the tie layer is from 1:1 to 1:20.

9. The stock material of claim 2 wherein the polyamide resin of the first outer layer is a member selected from the group consisting of nylon 6, nylon 66, nylon 6, 12, amorphous nylon, nylon 11, nylon 12, and nylon 4, 6.

10. The stock material of claim 2 wherein the polyolefin resin of the second outer layer is a member selected from the group consisting of polyethylene, polypropylene, polybutene-1, and polymethylpentene.

11. The stock material of claim 2 wherein the first layer of polyamide resin of the stock material and the first polyamide layer of the particulate material have the same composition.

12. The stock material of claim 2 wherein the second outer layer of polyolefin resin of the stock material and the second polyolefin layer of the particulate material have the same composition.

13. A process for producing a stock material of indefinite running length, said stock material comprising:
   A. a first outer layer of polyamide resin; and
   B. a second outer layer of polyolefin resin; and
   C. a tie layer between the first outer layer and the second outer layer; and
   wherein said tie layer constitutes means for bonding the first outer layer to the second outer layer; and
   wherein said tie layer is a composition which is a mixture of:
   (1) a copolymer of ethylene and maleic anhydride; and
   (2) the polyamide resin of the first outer layer; and
   (3) the polyolefin resin of the second outer layer; and
   (4) the composition of the tie layer; said process comprising the steps of:

I. coextruding the tie layer between, and in contact with the first outer layer and the second outer layer, at an elevated temperature to form a sheet of indefinite running length; and II. removing as scrap, unwanted portions from the sheet of indefinite running length; and III. grinding the scrap to produce particulate scrap; and IV. mixing the particulate scrap with the copolymer of ethylene and the maleic anhydride to form an adhesive composition; and then V. employing the adhesive composition as the tie layer in said coextruding step.

14. A process for producing a stock material of indefinite running length, said process comprising the steps of:

I. providing a particulate film material, said film material comprising a first polyamide layer, a second polyolefin layer, and a third layer of ethylene and maleic anhydride, said third layer being between the first polyamide layer and the second polyolefin layer; and II. admixing the particulate film material with a copolymer of ethylene and maleic anhydride to produce a tie layer composition; and III. coextruding the tie layer composition with a polyamide resin and a polyolefin resin to produce a stock material comprising:

A. a first outer layer of the polyamide resin;

B. a second outer layer of the polyolefin resin; and

C. a tie layer of the tie layer composition, said tie layer being between the first outer layer and the second outer layer;

wherein said tie layer consitutes means for bonding the first outer layer to the second outer layer.

15. The process of claim 14 further comprising the step of grinding the stock material produced in Step III to produce the particulate film material.

16. The process of claim 14 further comprising the steps of removing as scrap, unwanted portions of the stock material; and then grinding the scrap to produce a particulate film material; and then repeating Steps I through III.

17. A stock material in the form of a planar sheet produced by the process of claim 14.

18. A process for producing a stock material of indefinite running length, said process comprising the steps of:

I. providing a particulate film material, said film material comprising a first polyamide layer, a second polyolefin layer, and a third layer of ethylene and maleic anhydride in admixture with polyethylene, said third layer being between the first polyamide layer and the second polyolefin layer; and II. admixing the particulate film material with polyethylene and a copolymer of ethylene and maleic anhydride to produce a tie layer composition; and III. coextruding the tie layer composition with a polyamide resin and a polyolefin resin to produce a stock material comprising:

A. a first outer layer of the polyamide resin;

B. a second outer layer of the polyolefin resin; and

C. a tie layer of the tie layer composition, said tie layer being between the first outer layer and the second outer layer;

wherein said tie layer constitutes means for bonding the first outer layer to the second outer layer.

19. A process for producing a tie layer composition useful as a tie layer for bonding a first layer of polyamide resin to a second layer of polyolefin resin in a stock material, said process comprising the steps of:

I. providing particulate scrap, said scrap comprising unwanted portions of a multilayer film, said multilayer film comprising a polyamide layer, a polyolefin layer and a tie layer therebetween, said tie layer comprising ethylene and maleic anhydride in admixture with polyethylene; and then II. admixing the particulate scrap with polyethylene and a copolymer of ethylene and maleic anhydride to produce a tie layer composition.

* * * * *

UNITED STATES PATENT AND TRADEMARK OFFICE
CERTIFICATE OF CORRECTION

PATENT NO. : 4,668,571

DATED : May 26, 1987

INVENTOR(S) : James W. Moriarty, Jr.

It is certified that error appears in the above-identified patent and that said Letters Patent is hereby corrected as shown below:

Column 2, line 17, "secohd" should read --second--.

Column 5, line 17, "dry blended anhydride" should read --dry blended with a copolymer of high density polyethylene and maleic anhydride--.

First page, title should read --COEXTRUSION TIE LAYER AND PROCESS FOR PRODUCING SUCH TIE LAYER--.

Signed and Sealed this

Twelfth Day of April, 1988

Attest:

DONALD J. QUIGG

Attesting Officer

Commissioner of Patents and Trademarks